Sept. 27, 1955        R. GAMPER        2,719,057
PNEUMATIC CONVEYING APPARATUS
Filed June 17, 1953        5 Sheets-Sheet 1
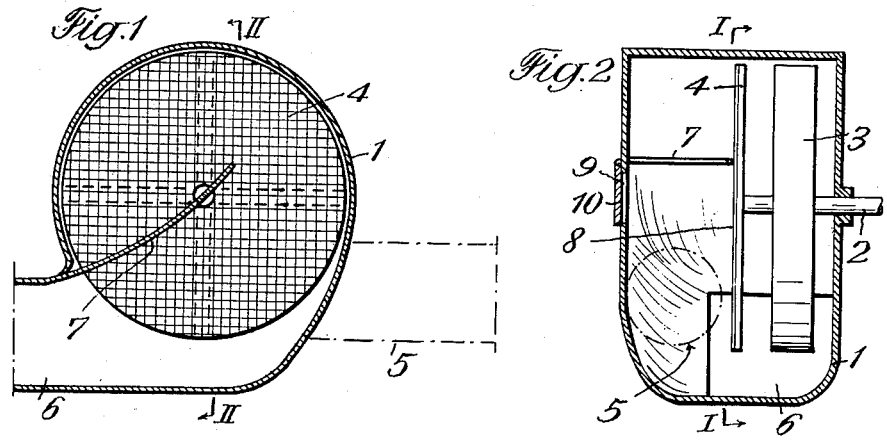
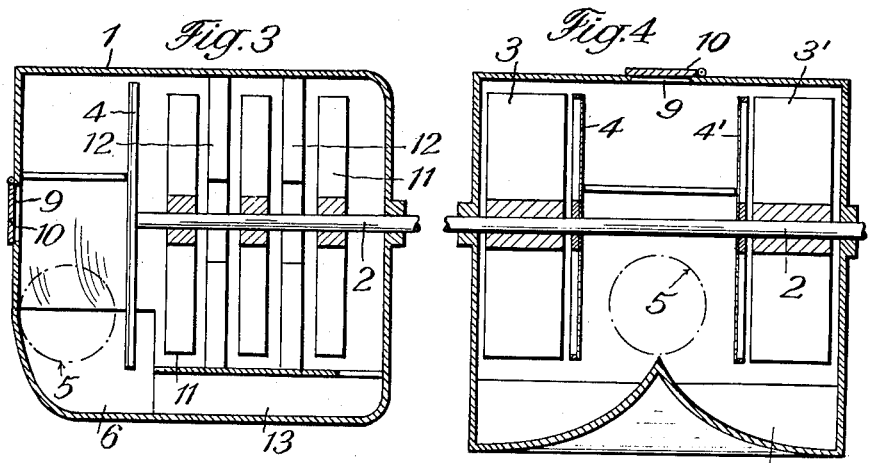
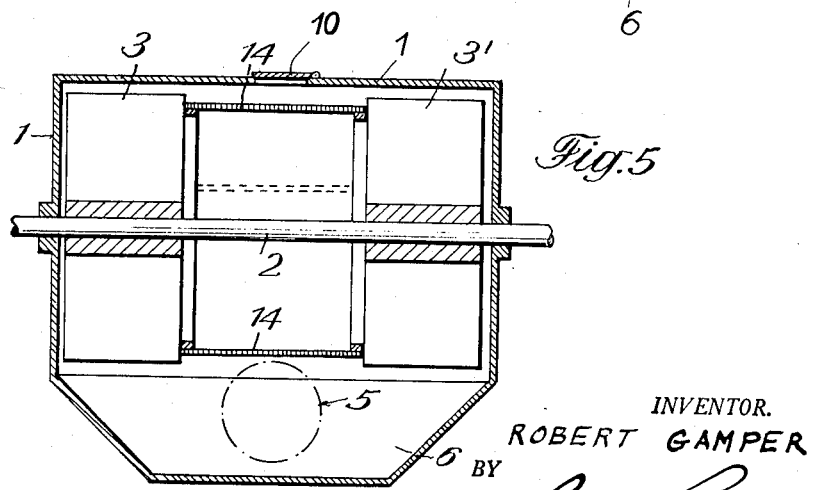
INVENTOR.
ROBERT GAMPER
BY
ATTY.

Sept. 27, 1955     R. GAMPER     2,719,057
PNEUMATIC CONVEYING APPARATUS
Filed June 17, 1953     5 Sheets-Sheet 2
FIG. 6
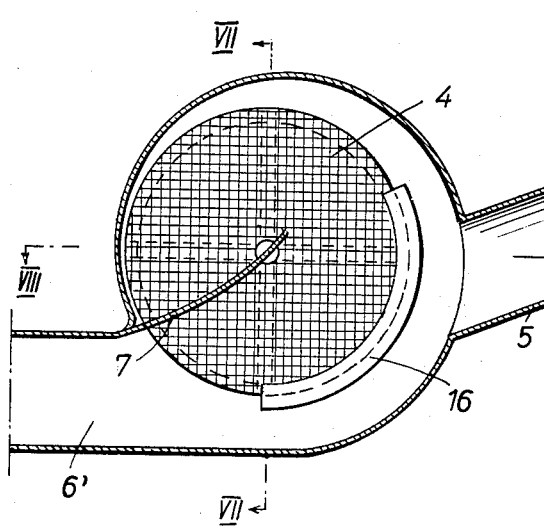
FIG. 7
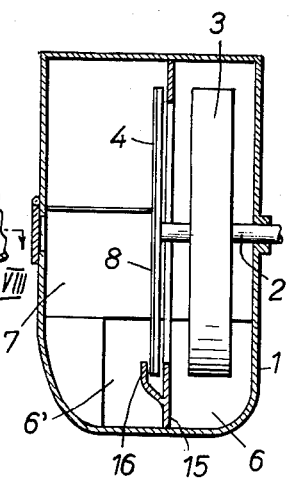
FIG. 8
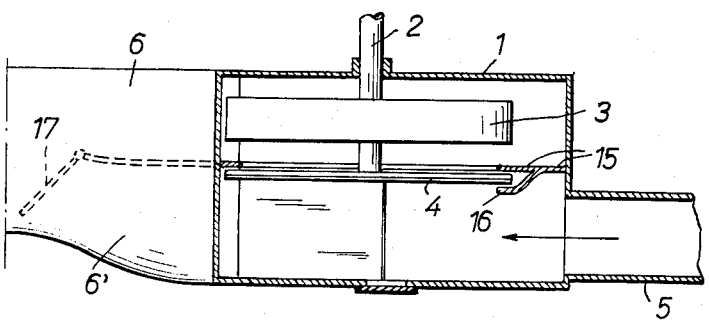
INVENTOR.
ROBERT GAMPER
BY
ATTY.

Sept. 27, 1955  R. GAMPER  2,719,057
PNEUMATIC CONVEYING APPARATUS
Filed June 17, 1953  5 Sheets-Sheet 3

INVENTOR.
BY ROBERT GAMPER
ATTY.

Sept. 27, 1955 R. GAMPER 2,719,057
PNEUMATIC CONVEYING APPARATUS
Filed June 17, 1953 5 Sheets-Sheet 4

INVENTOR.
ROBERT GAMPER
BY
ATTY.

Sept. 27, 1955  R. GAMPER  2,719,057
PNEUMATIC CONVEYING APPARATUS
Filed June 17, 1953  5 Sheets-Sheet 5
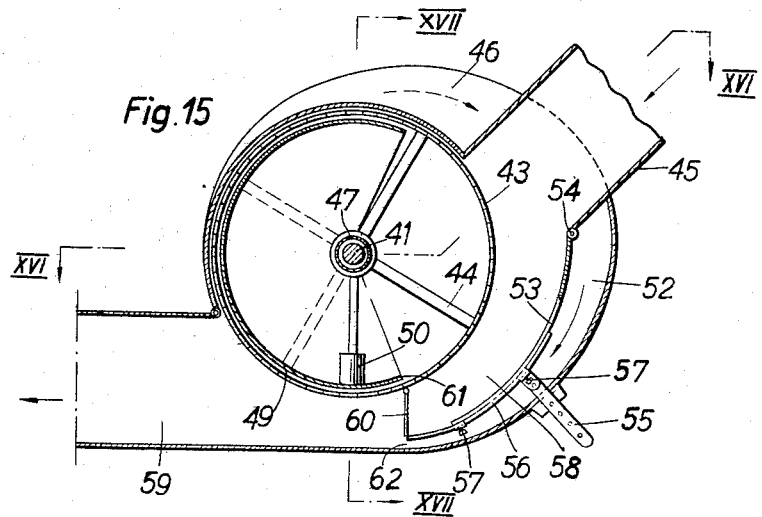
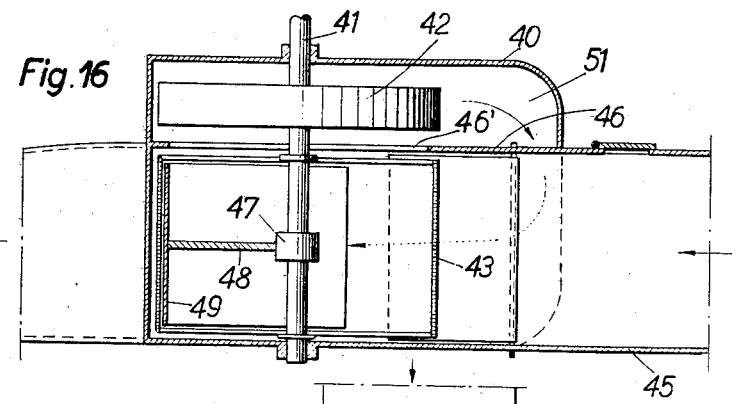
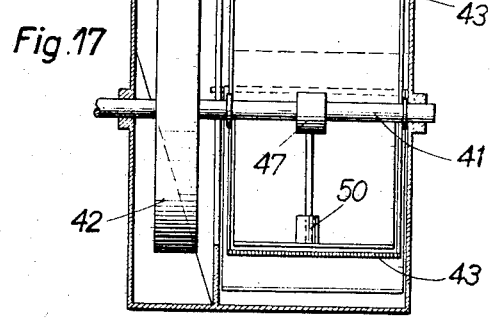
INVENTOR.
ROBERT GAMPER
BY
ATTY.

United States Patent Office 2,719,057
Patented Sept. 27, 1955

2,719,057

PNEUMATIC CONVEYING APPARATUS

Robert Gamper, Stettfurt, Switzerland

Application June 17, 1953, Serial No. 362,337

Claims priority, application Switzerland May 20, 1950

10 Claims. (Cl. 302—23)

This invention relates to pneumatic conveying apparatus of the type incorporating a rotary sieve and a blower the suction action of which feeds the goods to be conveyed through an inlet or suction conduit and delivers them through a passage by-passing the sieve and the blower into the blower outlet or pressure conduit.

The apparatus according to the invention is particularly adapted for conveying solid goods such as grains, seeds or other loose flowable material, or sheaves, straw, filled sacs or similar piece goods.

It is an object of the invention to provide a simple and reliable conveying apparatus of the type mentioned in which the suction line opens on the suction side of the rotary sieve in a substantially tangential direction to the movement of rotation and in which the suction line and the pressure line are in substantial alignment with each other so that the goods by virtue of their kinetic energy, when arriving at the suction side of the sieve, tend to move along said by-pass conduit into the pressure conduit of the blower.

Other objects and advantages of the invention will result from the following specification, reference being had to the accompanying drawings, showing several embodiments of the invention:

Fig. 1 shows a section through a conveying apparatus along the line I—I of Fig. 2, Fig. 2 is a section along the line II—II of Fig. 1, Fig. 3 is a section similar to that of Fig. 2, but showing a modified apparatus.

Figs. 4 and 5 each are a similar sectional view of a further modification.

Fig. 6 is a section similar to Fig. 1 through a further modification.

Figs. 7 and 8 are sections along the lines VII—VII and VIII—VIII of Fig. 6, respectively.

Fig. 15 is a vertical section through a further modification of the invention.

Fig. 16 is a section along the line XVI—XVI of Fig. 15.

Fig. 17 is a vertical section along the line XVII—XVII of Fig. 15.

Figure 9:
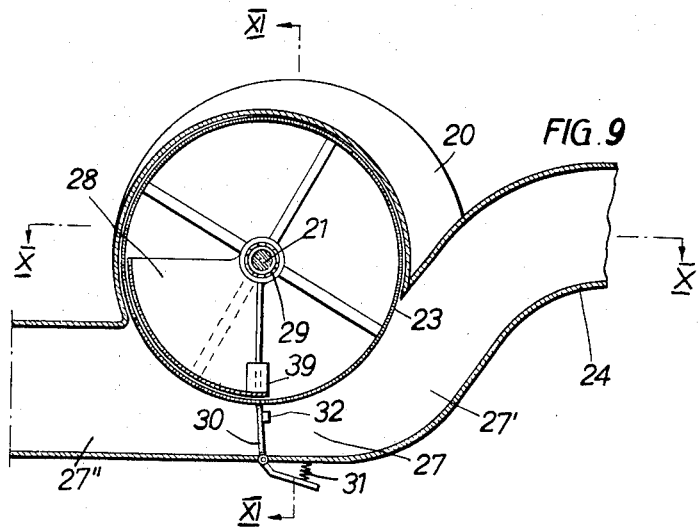
Fig. 9 is a vertical section through a further modified conveying apparatus.

Referring to Figs. 1 and 2, the numeral 1 designates a casing in which is mounted a drive shaft 2 carrying a blower impeller 3 and a rotatable sieve 4 which may consist of perforated sheet iron or of wire mesh. A suction line 5 through which the goods to be conveyed are aspirated, opens into the casing 1. A pressure line 6 is connected to the casing 1, a baffle 7 being formed so as to constitute a strickle 8 along the sieve. When the shaft 2 is driven, the impeller 3 and the sieve 4 rotate. Air and goods are aspirated through the suction line 5. The goods entering into the casing 1 have the tendency, by virtue of their kinetic energy, to move directly into the pressure line 6, since the latter substantially forms an extension of the suction line 5 and is substantially alined therewith. The goods which are aspirated by the suction air current towards the sieve 4, are flung away by the latter through centrifugal action and move into the pressure line 6. If some of the goods are taken along by the sieve, they are stripped from the latter through the strickle 8 and led by the baffle 7 into the pressure line 6. An inlet port 9 is disposed in the casing 1 on the suction side of the blower and may be closed or more or less opened by means of a flap 10 in order to introduce secondary air into the blower as required.

The apparatus shown in Fig. 3 differs from that shown in Figs. 1 and 2 in that the impeller 13 is replaced by a multi-stage axial compressor having bladed rotors 11 and guide vane blading 12. A duct 13 runs from the delivery side of the compressor to the pressure line 6. The construction and mode of operation of this apparatus otherwise is similar to those of the example shown in Figs. 1 and 2.

In the form of invention shown in Fig. 4, two blower impellers 3, 3' are so mounted on a common shaft 2 that their suction sides are opposite to each other. A plane sieve 4, 4' is mounted on the shaft 2 on the suction side of each impeller 3, 3'. The suction line 5 opens substantially tangentially intermediate of the two sieves 4, 4'. A common pressure line 6 is connected to the pressure sides of the two impellers 3, 3'. The goods pass from the suction line 5 directly through a by-pass into the pressure line 6, the goods impinging on the sieves 4, 4' being flung through centrifugal action into the pressure line 6. A in the first form shown, strickles and baffles are provided. In the example shown in Fig. 5, a drum-like sieve 14 is inserted between the two impellers 3, 3' in place of the two sieves 4, 4', which drum sieve 14 rotates with the impellers 3, 3'. The suction line opens tangentially to the sieve 14, the goods impinging against the latter also being flung into the common pressure line. The sieve 14, instead of being cylindrical, could be shaped differently, for example in the form of two truncated cones.

The cylindrical or otherwise formed sieve 14 shown in Fig. 5 could be used in an apparatus as shown in Figs. 1, 2 or 3, in place of the plane sieve 4.

The inlet opening 9 could be closed or more or less opened, respectively, by means of a valve, a slide or the like.

In the example shown in Figs. 6–8, which otherwise is similar to that disclosed in Figs. 1 and 2, the casing 1 is spiral-shaped, and a partition 15 is provided intermediate the impeller 3 and the rotary sieve 4 which is mounted on the shaft 2. The partition 15 within the range of the sieve 4 is provided with a circular opening through which the air may be aspirated from the suction line 5 through the impeller 3. Where the suction line 5 opens into the casing 1, an apron 16 is provided on the partition 15, which overlaps the edge of the sieve 4, and prevents the goods which enter through the suction line 5 from being caught in the gap between the sieve 4 and the partition 15 or from damaging the sieve. As seen in Fig. 8, the pressure line 6 connected to the impeller 3 is separated from the by-pass 6' through the partition 15. The baffle 7 with strickle 8 serves for stripping the goods from the sieve 4, as in the example shown in Figs. 1 and 2, and for leading the same into the by-pass 6'. At the end of the partition 15, at the juncture of the pressure line 6 and the by-pass 6', a flap 17 is provided which prevents compressed air from returning to the suction side of the blower. That portion of the partition 15 which separates the pressure line 6 and the by-pass 6', may be conically tapered towards the compressed-air side so that a certain suction is exerted on the goods in the by-pass 6', in a manner similar as in an injection nozzle. Depending on the pressure conditions, the flap 17 may be more or less opened or closed. The flap 17 could be omitted when there is no risk of compressed air flowing back.

Figure 10:
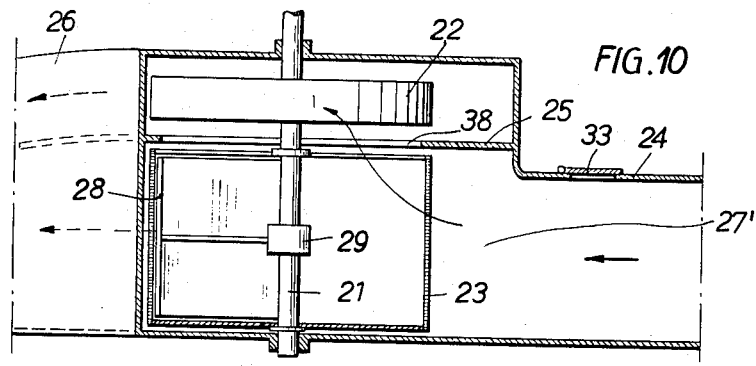
Fig. 10 is a horizontal section along the line X—X of Fig. 9.
Figure 11:
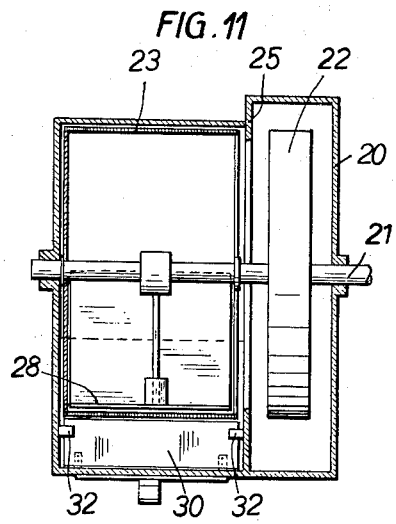
Fig. 11 is a vertical section along the line XI—XI of Fig. 9.

With reference to Figs. 9 to 11 the spiral-shaped casing 20 has mounted in its sidewalls a shaft 21 carrying adjacent to each other a blower 22 and a drum-shaped sieve 23. A suction line 24 delivers air into the casing 20. A partition 25 having a circular hole 38 is disposed between the blower 22 and the sieve 23. Air from the suction line 24 is drawn through the sieve 23 and said hole 38 into the blower 22. The blower delivers air into the pressure line 26 which is separated by the partition 25 from the direct passage 27 for the goods to be conveyed between the suction line 24 and the pressure line 26. The partition 25 may be provided, at the place where the passage 27 opens into the pressure line 26, with a flap similar to the flap 17 of Fig. 8. The passage 27 comprises a portion 27' in which the goods are approaching the sieve 23, and a portion 27" in which the goods moves away from the sieve 23. Inside of the sieve, that is to say on the side of the sieve exposed to the blower, a cylindrically curved covering lid 28 is provided to conceal a portion of the sieve surface. The covering lid is rotatably mounted on the shaft 21 by means of a ball bearing 29 and is loaded by a weight 39 so that upon rotation of the shaft 21, the lid is substantially maintained in the position represented in Fig. 1. A throttle 30 is disposed in the passage 27 between the portions 27' and 27", and a spring 31 or a weight tends to move the throttle to closing position. This closing position is determined by stops 32. The suction line 24 is provided with a flap covered opening permitting, if desired to supply additional air to the blower.

During operation of the apparatus, air and goods to be conveyed are sucked through the suction line 24. The air traverses the sieve 23 to be fed to the blower and is delivered by the latter into the pressure line 26. The goods arrive in the passage 27, and according to the volume of the goods the throttle is opened more or less, so that the goods may pass from the suction portion 27' to the delivery portion 27" without being hindered. In the latter portion 27" there is no suction action of the blower on the outside of the sieve owing to the covering lid 28, so that the goods do not adhere to the sieve surface and under the action of the centrifugal force of the rotating sieve, the goods are freely delivered into the pressure line 26. The throttle prevents that air and goods may be sucked back from the pressure side to the suction side.

Figure 12:
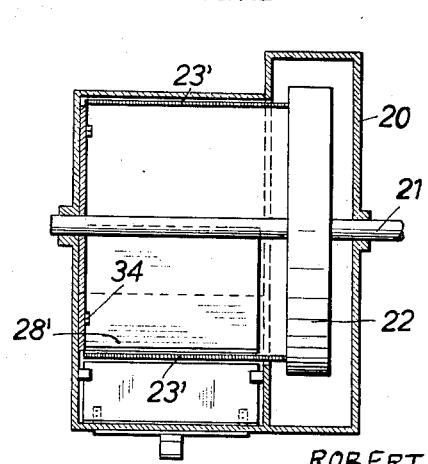
Fig. 12 is a similar section as that shown in Fig. 11, but of a modified apparatus.

The modification according to Fig. 12 is similar to that shown in Figs. 9 to 11, except that the covering lid 28' also formed by a portion of a cylinder, is fixed by screws 34 to the casing 20, instead of being rotatably mounted on the shaft 21. The sieve drum 23' is laterally fixed to the blower 22 to rotate therewith. This more simple structural design is suitable for smaller conveying apparatus, while the modification according to Figs. 9 to 11 may be used also for larger size apparatus.

Figure 13:
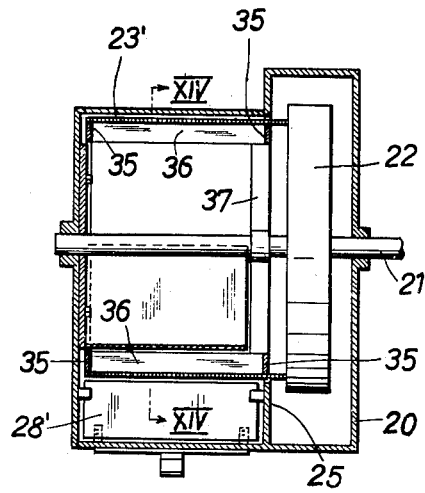
Fig. 13 is a vertical section through a further modification.
Figure 14:
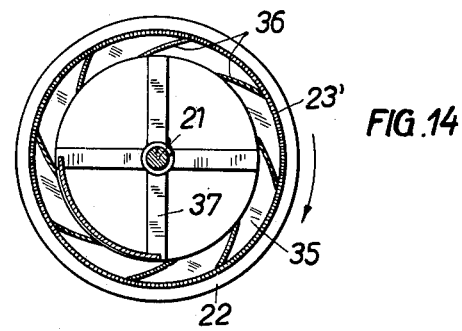
Fig. 14 is a transverse section along the line XIV—XIV of Fig. 13.

In the example according to Figs. 13 and 14, the cylindrical sieve drum 23' is provided on its inside with a blower having blades 36 disposed between two end discs 35. The blades 36 are so inclined that upon rotation of the sieve in the direction of the arrow in Fig. 14, the blades tend to suck air from the outside of the drum and make it pass through the sieve inwardly. The blower 35, 36 is mounted on the shaft 21 by means of four propeller vanes 37. These vanes are so arranged as to suck air from the left in Fig. 13, that is from the inside of the sieve to deliver it axially to the blower 22. The covering lid 28' is also fixed to the casing 20 as in Fig. 12 and covers a portion of the blower 35, 36 and also a corresponding portion of the sieve 23'. The blower 35, 36 and the vanes 37 form an additional supporting structure for the sieve 23' on the shaft 21 and form together with the blower 22 a plural stage blower system. The operation is the same as that described with reference to Figs. 9 to 12.

The covering lid also could be secured to the partition wall 25 in which case the cylindrical sieve on the side remote of the blower 22 must be supported on the shaft 21.

The covering lid can also be provided in the form of the apparatus described with reference to Figs. 1 to 8. When the sieve is formed as a plane disc as represented in Figs. 1 to 4 and 6 to 8, the covering lid can be formed as sector, so as also to intercept the suction action of the blower in that area of the sieve where the goods are discharged into the pressure line, so that the goods are separated from the sieve by the action of the centrifugal force and pass into the pressure conduit.

In the modification according to Figs. 15 to 17 a shaft 41 is mounted in the side walls of a casing 40. The shaft carries side by side a blower 42 and a drum-shaped sieve 43, which is supported with both end faces on the shaft 41. The drum could also be secured to the blower. The suction line 45 opens into the casing 40. A partition wall 46 of the casing is disposed between the blower 42 and the sieve 43. The wall 46 is provided with a circular opening 46' through which air from inside of the sieve is drawn into the blower 42. A covering lid 49 formed by a portion of a cylinder surface is rotatably mounted by the intermediary of a ball bearing 47 and a wall portion 48 on the shaft 41. The covering lid 49 is charged by a weight 50 so as to remain in its position shown in Fig. 15 when the shaft 41 rotates. The covering lid could also be secured to one side wall of the casing. The pressure chamber 51 surrounding the blower is of spiral shape and communicates by an opening with a nozzle-shaped duct 52 limited on its lower side by a portion of the casing wall and on its upper side by an adjustable wall 53. This wall 53 is hingedly connected at the inner end of the suction line at 54 and can be adjusted to various angular positions by means of a rod 55. The wall 53 carries a movable plate 56 which can be fixed by screws 57 in adjusted positions. By angularly displacing the wall 53 by means of the rod 55 the height of the opening of the nozzle-shaped duct 52 can be varied. Further by moving the plate 56 the point where the duct 52 opens into the passage 58 can be displaced, said passage connecting the intake conduit 45 with pressure line 59. As may be seen in Fig. 15, the place 62 where the duct 52 opens into the passage 58 for the goods to be conveyed is located approximately in proximity of the forward edge 61 of the covering lid 49 where the goods fall off from contact with the sieve. It is further visible from Fig. 16 that the opening of the nozzle duct 52 extends over the total width of the passage 58 for the goods, so that the conveyed material is entrained uniformly over the whole width into the pressure line 59. The throttle 60 prevents air and material from being sucked back from the pressure line into the suction zone.

The described apparatus can also be used for cleaning and sorting, grading or classifying flowable material, such as grains, seeds and the like. In this case the dust, or during sorting, the smaller grains, pass through the sieve and the blower into the open air, while the remaining material is separated at the sieve and leaves the outside face of the sieve in the zone of the covering lid, in order to drop into a vertical or inclined chute, within the lower part of which a flap is hingedly connected and subjected to the action of a counter-weight; the separated material then fills the chute up to a certain level determined by the weight of the counterweight, so that the weight of the material balances or excels the action of the vacuum on the suction side.

This application is a continuation-in-part of application No. 226,990 filed May 18, 1951, now abandoned.

What I claim is:

1. Apparatus for pneumatically conveying solid materials, comprising a casing, a drive shaft mounted in the casing, a blower on said shaft, a rotary sieve on said shaft upstream of the blower, a suction line opening upstream of said sieve surface in substantially tangential direction to the sieve, a pressure line in communication with the pressure side of the blower, said suction line and said pressure line being in substantial alignment with each other, a by-pass conduit externally of said sieve for connecting said suction and pressure lines, a non-rotating covering member at least at one side of said sieve for covering a portion of said sieve surface in the zone where the materials to be conveyed move away from the sieve whereby to prevent the suction action of the blower from being effective at said portion of the sieve surface and to permit separation of the material from the sieve surface and free flow of the material to said pressure line by the action of the centrifugal force.

2. Apparatus according to claim 1, wherein said covering member is arranged on said drive shaft rotatably, relative to this shaft and is maintained by a weight in the desired angular position.

3. Apparatus according to claim 1, wherein said covering member is secured in fixed position in said casing.

4. Apparatus according to claim 1, wherein said sieve member is formed as sieve drum and said covering member is formed as portion of the surface of a cylinder.

5. Apparatus according to claim 4, wherein the sieve drum is supported on said drive shaft by means of propeller vanes effective to assist the suction action of said blower.

6. Apparatus according to claim 4, wherein fan vanes are annularly arranged at the inside of the sieve drum along the periphery thereof, so as to draw air from outside of the sieve drum into the interior of the drum.

7. Apparatus according to claim 1, wherein a throttle member is provided in said by-pass between the zone where the material approaches the sieve surface and the zone where the material moves away from the sieve surface, in order to prevent that air and material are returned from the pressure line by suction of the blower.

8. Apparatus according to claim 1, wherein the pressure line downstream of the blower is so guided that in proximity of the leading edge of said covering member where the material moves away from the sieve surface the pressure line having the shape of a nozzle opens into the by-pass conduit for the material.

9. Apparatus according to claim 8, wherein said nozzle-shaped pressure line opens into said by-pass over the entire width of the latter.

10. Apparatus according to claim 8, wherein a wall of the nozzle-shaped pressure line is angularly adjustable to vary the height of the nozzle opening, said wall carrying a movable plate which is adjustable to vary the position at which said nozzle opens into said by-pass for the material.

References Cited in the file of this patent

UNITED STATES PATENTS

| | | |
|---|---|---|
| 636,670 | Jones | Nov. 7, 1899 |
| 1,174,224 | Blackmon | Mar. 7, 1916 |
| 1,227,128 | Foster | May 22, 1917 |
| 2,643,159 | Brackett | June 23, 1953 |

FOREIGN PATENTS

| | | |
|---|---|---|
| 699,761 | Germany | Nov. 7, 1940 |